United States Patent [19]

Ikoma et al.

[11] Patent Number: 4,837,119

[45] Date of Patent: Jun. 6, 1989

[54] SEALED STORAGE BATTERY AND METHOD FOR MAKING ITS ELECTRODE

[75] Inventors: Munehisa Ikoma; Hiroshi Kawano; Isao Matsumoto; Nobuyuki Yanagihara, all of Osaka, Japan

[73] Assignee: Matsushita Electric Industrial Co., Ltd., Japan

[21] Appl. No.: 132,647

[22] Filed: Dec. 8, 1987

[30] Foreign Application Priority Data

Dec. 8, 1986 [JP] Japan .................................. 61-291830
Dec. 8, 1986 [JP] Japan .................................. 61-291832
Aug. 25, 1987 [JP] Japan .................................. 62-210468
Aug. 26, 1987 [JP] Japan .................................. 62-212089

[51] Int. Cl.$^4$ ............................................. H01M 4/36
[52] U.S. Cl. .................................... 429/206; 429/218; 429/220; 429/222; 429/223
[58] Field of Search ................... 429/57, 59, 101, 206, 429/209, 218, 220, 222, 223, 251; 420/900; 252/181.6, 182.1

[56] References Cited

U.S. PATENT DOCUMENTS

4,716,088 12/1987 Reichman et al. .................. 429/101

FOREIGN PATENT DOCUMENTS

0170519 2/1986 European Pat. Off. .
59-181459 10/1984 Japan .
60-77357 5/1985 Japan .
61-47075 3/1986 Japan .
61-64069 4/1986 Japan .
61-101957 5/1986 Japan .
61-176063 8/1986 Japan .
2162994 2/1986 United Kingdom .

OTHER PUBLICATIONS

Chemical Abstracts, vol. 106, No. 1, Jan. 5, 1987, Columbus, Ohio, USA; Furukawa, Sanehiro et al., "Hydrogen Absorbing Anode", p. 151, col. 1, abstract-No. 7 556b & Jpn. Kokai Tokkyo Koho JP 61 168 871.
Chemical Abstracts, vol. 106, No. 1, Jan. 5, 1987, Columbus, Ohio, USA; Furukawa, Sanehiro et al., "Metal-Hydrogen Alkaline Battery", p. 151, col. 1, abstract-No. 7 557c & Jpn. Kokai Tokkyo Koho JP 61 168 870.

Primary Examiner—Anthony Skapars
Attorney, Agent, or Firm—Lowe, Price, LeBlanc, Becker & Shur

[57] ABSTRACT

A sealed storage battery comprises a positive electrode including a metallic oxide as an active material, a negative electrode including hydrogen-storage-alloy powder capable of electrochemically charging and discharging hydrogen as an active material, an alkaline electrolyte, and two separators (12a and 1 2b) for absorbing and retaining the alkaline electrolyte. The hydrogen-storage-alloy power has a crystal structure and is provided with numerous irregularities on the surface thereof, and has SF-value of 2.5 or below, which SF-value represents a plateau characteristic of equilibrium pressure of released hydrogen. The numerous irregularities on the surface of the alloy powder cause oxygen being generated from the positive electrode to be eliminated promptly.

11 Claims, 10 Drawing Sheets

SEALED STORAGE BATTERY AND METHOD FOR MAKING ITS ELECTRODE

BACKGROUND OF THE INVENTION

This invention relates to a sealed storage battery and a method for making its electrode, and more particularly, the present invention relates to an alkaline storage battery.

Nowadays, a lead-acid storage battery and a nickel-cadmium storage battery are predominantly used as a sealed secondary battery. Although the lead-acid storage battery is of low cost, this battery is insufficient from the point of the view of weight density or cycling life-time when used as the electric power supply of a portable apparatus which is in use for a long time. On the other hand, although the nickel-cadmium storage battery is of comparatively high cost, the demand for this battery has been increasing, and more particularly, this battery has become widely applied in fields where high reliability is required because this battery can remove the drawbacks of the lead-acid storage battery. Various improvements for providing nickel-cadmium storage battery with high capacitance have been made since it is desired to have higher energy density electric power supplies of the portable apparatus in addition to the special merits described above. However, a cadmium electrode as a negative electrode has a high utilization factor of an active material, especially a large electrode decrease at a high-rate discharge in comparison with a nickel electrode as the positive electrode. Moreover, when constructing the storage battery of capacitance regulation at the positive electrode, it is necessary to take allowance to except capacitance at the positive electrode so as not to generate hydrogen at the negative electrode when overcharging. Therefore, the negative electrode has the capacitance capable of charge and discharge larger than the positive electrode. Moreover, it is necessary for the porosity of the negative electrode to be increased to an optimum value in order that an overcharge, oxygen gas generated from the positive electrode is efficiently absorbed by the negative electrode. However, it is not possible for the negative electrode to have higher energy density until a rapid improvement is made. Therefore, there is a limit in the improvement of the energy density of the nickel-cadmium storage battery.

Recently, a metallic oxide-hydrogen storage battery has attracted the attention of many people in which battery a hydrogen-occlusion-alloy or hydrogen-storage-alloy, which can occlude and release electrochemically hydrogen is applied as the material of the negative electrode, instead of the nickel-cadmium storage battery. In this storage battery, even if hydrogen is generated from the negative electrode on overcharge, hydrogen is dissipated through discharge or is occluded by the hydrogen-occlusion-alloy of the negative electrode, in so far as hydrogen is not released out of the battery. Moreover, this storage battery has a higher energy density per unit volume than the nickel-cadmium storage battery. As a result, where the capacity of this storage battery is equal to that of te nickel-cadmium storage battery, this storage battery can be constructed such that the volume of the negative electrode of this storage battery is smaller than that of the cadmium negative electrode. Therefore, a larger active material as the positive electrode can be appropriated in the residual space of this storage battery, so that a higher energy density is expected. Moreover, the material of the hydrogen-occlusion-alloy obviates the need for a metallic cadmium which is a main component of the cadmium electrode, so that there is little polution by heavy metal or the like.

With these points as background, a new secondary battery is developed for use in various fields. However, many problems need to be solved if this storage battery is commercialized. One of the important problems is that techniques for constructing a sealed storage battery by means of a simple method and for lenghthening the life-time of the battery must be carried out to be competitive with the nickel-cadmium storage battery. Namely, metallic oxide-hydrogen storage battery, whose maintenance is easy and which has high reliability, must be perfected. From the above-mentioned stand point, as the condition which are required for the hydrogen-occlusion-electrode to use the hydrogen-occlusion-alloy, the hydrogen-occlusion-electrode must have stability in an alkaline electrolyte and occlude and release electrochemically hydrogen. Moreover, other important conditions are the following (1)–(3).

(1) The hydrogen-occlusion-electrode must have a large capacity for occluding and releasing electrochemically hydrogen, and discharge capacitance must not decrease even if charge and discharge are repeated.

(2) An ordinary sealed storage battery is designed such that for safety, the pressure gas in the battery is kept at a given value or below with a safety valve being operated when the pressure in the battery becomes 10 to 15 $kg/cm^2$. Therefore, the material must be selected which does not generate hydrogen on charging within given temperature ranges where the battery is used since in this storage battery system, it must designed designed as well as the ordinary sealed storage battery as described above.

(3) The hydrogen-occlusion-electrode must have a corrosion resistance to oxygen generated from the positive electrode on overcharging. Moreover, the alloy material must be used which has a function for smoothly carrying-out oxygen-elimination reactions that on the surface of the alloy where, the reaction of oxygen with occluded hydrogen gives water. Moreover, an alloy material should be used to construct the electrode. Although many alloy materials and many methods for constructing an electrode satisfying these conditions (1) to (3) have been pursued, they do not always reach the operating level of the sealed nickel-cadmium storage battery, i.e., where the cycling life-time is 500 cycles or above, and the inner pressure of the battery is 5 to 10 $kg/cm^2$ or below, when the battery is charged to the level of approximately 1/3 CmA.

Concerning (1), an alloy of $AB_5$, which is a basic form of $CaCu_5$ type alloy and in which lanthanum series metals are mainly used as A and nickel is mainly used as B, has the largest possibility of a practical application. However, even if the alloy of $AB_5$ is used as a hydrogen-occlusion-electrode, the electrode is oxidized by oxygen gas generated at the positive electrode on overcharge to decrease the capacity of occluding and releasing hydrogen. In order to solve the above-mentioned problem, a method is used so that the surface of the alloy is covered with a metal having the property of corrosion resistance (Japanese patent provisional publication No. 61-64069 or No. 61-101957) and the entire electrode is covered with the same metals described above (Japanese patent provisional publication No.

60-77357) In these methods, however, a large amount of covering metal is needed when occluding and releasing hydrogen constantly for a long period. Therefore, the amount of hydrogen-storage-alloy becomes relatively small. As a result, capacitance density per unit volume decreases, so that this is a disadvantage in making the battery having high capacitance.

Concerning (2), it is necessary to guarantee the safty of the battery from the standpoint of the user. Therefore, it is necessary to provide with safety valve which releases the gas generated in the battery out of the battery when inner pressure rises above a given value, in order that the battery is not damaged and does not explode in case of the abnormal increment of the inner pressure. However, the actuation of the safety valve causes the electrolyte to be released out of the battery, so that the reduction of the electrolyte causes batteries properties to deteriorate. Therefore, an effectual method for the improvement of battery properties, especially cycling life-time, is to avoid these increments of inner pressure. As a result, materials which do not generate hydrogen on charging have been selected by using materials which have a low equilibrium pressure of hydrogen (Japanese patent provisional publication No. 59-181459 or No. 61-47075).

Concerning (3), various methods have been proposed so that oxygen gas generated when overcharging is reacted effectually so as to decrease the inner pressure of the battery. As described above, the increment of the inner pressure caused by the generation of oxygen gas is one of the reasons for actuating the safety valve. Therefore, it is necessary to change oxygen generated to water rapidly so as to prevent the increment changes in the inner pressure of the battery. Moreover, there is another important problem as the alloy may be oxidized by oxygen gas generated. Hydrogen is or stored in the inner portion of the alloy and an electrical potential itself does not carry out oxidation. However, when repeating charge and discharge, oxidation progresses gradually from the surface of the alloy, which surface is in contact with oxygen, to the inner portion of the alloy. As a result, electron conduction properties decrease. Moreover, the amount of hydrogen to be occluded and to be released decreases, and the decrease of a discharge voltage and the decrease of the property of the cycling life-time arise. It is necessary to make an electrode which has an excellent corrosion resistance in order to avoid the above-mentioned problems. However, to the present, a sealed metallic oxide-hydrogen storage battery has not been be obtained which solves the above-mentioned problems (1) to (3) and has high capacitance and long life-time. Moreover, it is well known that in the sealed nickel-hydrogen storage battery, self-discharge is large. An improvement of the self-discharge must be carried out in order that this battery is applied in a practical manner. Therefore, the self-discharge of this battery must be improved at least to the level of the sealed nickel-cadmium storage battery.

Nowadays, in ordinary use, a nonwoven fabric made of a polyamide is utilized as a separator in the sealed nickel-cadmium storage battery. Moreover, a separator wherein surfactants are added to the nonwoven fabric of a polyolefin to improve hydrophilic properties is used for some batteries for applications in high temperature areas. When the nonwoven fabric made of polyamide is applied as the separator to the sealed nickel-hydrogen storage battery, self-discharge becomes a substantial problem. This is because the surface of the negative electrode has a very high activity and strong reducing power in comparison with the cadmium electrode. Another reason is that polyamide is decomposed by charging and discharging, and resulting oxidants and reductants in the ionic state or polar ion coexist in the electrolyte. Thereafter, reactions wherein the materials reduced at the negative electrode are oxidized at the positive electrode are repeated, i.e. $NO_3-$ and $NO_2-$, so that the self-discharge increases. When a separator is used wherein separator surfactants are added to the nonwoven fabric of the polyolefin, charge and discharge cause the property of the surfactants to charge so that the battery property is harmfully affected with the hydrophilic property being decreased. Therefore, a separator is required which is chemically stable to charge or discharge, and has a strong hydrophilic property to the electrolyte.

SUMMARY OF THE INVENTION

The present invention has been developed in order to remove the above-described drawbacks and provides a sealed storage battery having a high capacitance and a long life-time by improving a hydrogen-storage-alloy as a negative electrode and an electrode using this alloy in order to construct a sealed metallic oxide-hydrogen storage battery.

A hydrogen-storage-alloy is utilized as a material of a negative electrode, and more particularly, an alloy of $AB_5$ having a crystal structure of the $CaCu_5$ type is utilized. Moreover, B in the alloy of $AB_5$ is partially replaced by metals except nickel so as to obtain a material having equilibrium disassociation pressure where hydrogen is occluded and released sufficiently in the temperature range of the battery operation. Although A in the alloy of $AB_5$, i.e. lanthanum series of metals, is gradually oxidized to change an oxide or hydroxide by repeating charge and discharge in a sealed storage battery system, it is difficult to basically prevent such a phenomenon. Therefore, it is very important to suppress oxidizing velocity.

In the present invention, corrosion resistance can be improved by a method that the crystallinity of the alloy is improved. Generally, the pluralization of the alloy of $AB_5$ type causes the crystallinity to decrease. However, it is necessary to pluralize the alloy because the alloy must have the disassociation pressure of hydrogen as described above. Therefore, in the present invention, the crystallinity of the alloy is improved by the method wherein the pluralized alloy is rapidly cooled, treated with heat, and so on. SF(slope factor)-value is adopted as the standard of the crystallinity.

Moreover, the increment of a specific surface area, namely, numerous irregularities are provided on the surface of the alloy in order that the reducing reaction of oxygen is promptly carried out and corrosion resistance is increased only in the vicinity of the surface of the hydrogen-storage-alloy.

Figure 1:
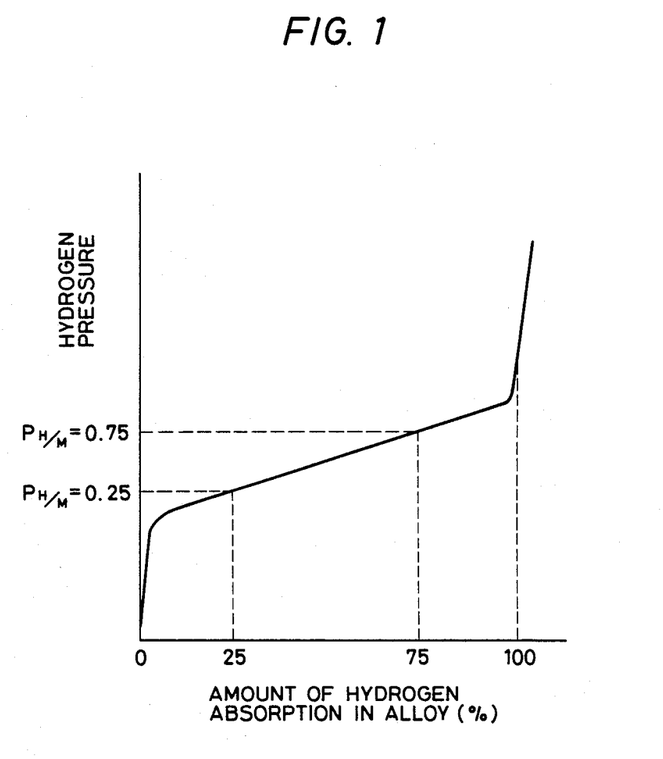
FIG. 1 is a graph showing a relation between hydrogen pressure and hydrogen concentration in an alloy obtained when releasing hydrogen at a given temperature after compressed gas is sufficiently occluded in a hydrogen-storage-alloy.

SF-value will be described hereinbelow: This value shows the plateau characteristic of the hydrogen-storage-alloy. When hydrogen is occluded or released by a gas reaction at a given temperature, the relation between the pressure of hydrogen and hydrogen concentration in the alloy is shown as FIG. 1. Using the pressure of hydrogen ($P_{H/M=0.75}$) when occluding hydrogen of 75% and the pressure of hydrogen ($P_{H/M=0.25}$) when occluding hydrogen of 25%, this value is calculated by the following formula.

$$SF = \ln(P_{H/M=0.75}/P_{H/M=0.25})$$

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figures 2A, 2B:
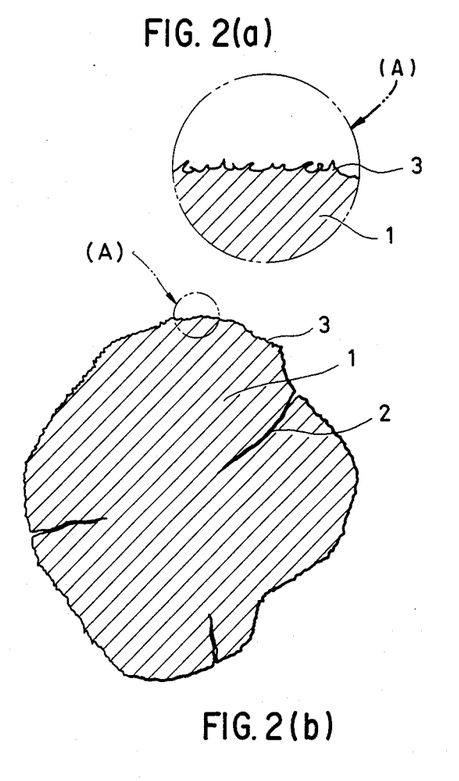
FIG. 2 is a cross-sectional drawing of a hydrogen-storage-alloy powder obtained according to the present invention.
Figure 3:
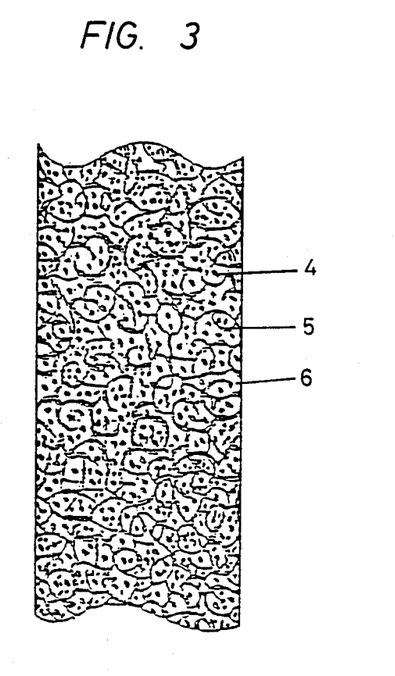
FIG. 3 is a cross-sectional view showing a structure in which a sponge-like nickel porous body is filled with the alloy powder according to the present invention.
Figure 4A:
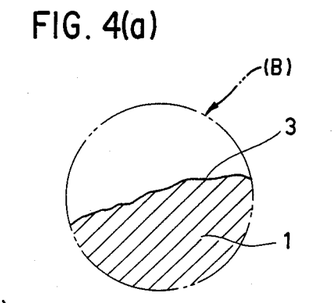
FIG. 4 is a cross-sectional drawing of the hydrogen-storage-alloy powder without both acid and alkali treatments.
Figure 4B:
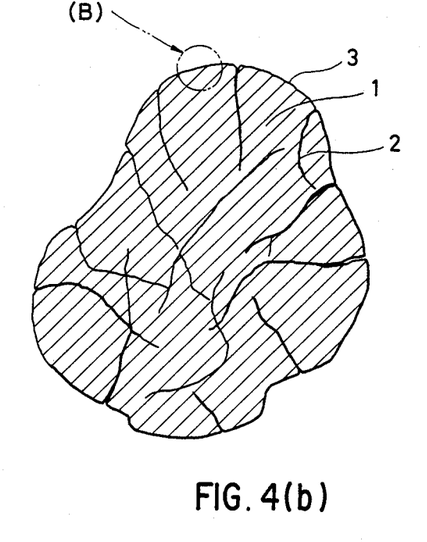

Referring to FIGS. 2 to 6, one embodiment of the present invention will be described hereinbelow. Misch metal (Mm), nickel (Ni), cobalt (Co), aluminum (Al), and manganese (Mn) are mixed in the ratio of the number of atoms as follows: 1:3.5:0.8:0.3:0.4 respectively. The misch metal is composed of mainly about 40 wt % of cerium, about 30 wt % of Lanthanum, and about 13 wt % of neodymium. The mixture is melted by using a high-frequency furnace in the atmosphere of inert gas. The mixture is transferred to a container having a cooling apparatus while stirring, and then, the mixture is rapidly cooled. The resulting alloy is roughly crushed with a mechanical means. After this, the alloy is heated to 1050° C. in an atmosphere of argon gas and is held at 1050° C. for 3 hours, so that a hydrogen-storage-alloy is obtained whose SF-value is 2.5 or below. Next, the alloy is crushed again to a fine powder whose diameter is 37 μm or below. The powder is immersed in a dilute nitric acid (1N) for a few minutes, and then, is immersed in a KOH aqueous solution (7N) at 80° C. for approximately 30 minutes. By washing with water and drying, the alloy powder 4 having numerous irregularities in the vicinity of the surface layer whose depth is approximately 0.01 μm is obtained. FIG. 2 shows a cross-sectional drawing of the hydrogen-storage-alloy powder obtained by the above-mentioned operation. In FIG. 2, numeral 1 denotes a portion having a high crystallinity in the powder. On the other hand, numeral 2 denotes a portion having a poor crystallinity where the alloy is not decomposed by the above-mentioned compounding ratio when analyzed in detail. Numeral 3 denotes the surface layer of the alloy powder. A portion of (A) of the surface layer is enlarged and is shown in the circle. The mixture is melted in a high-frequency furnace, which mixture composition is equal to that of the above-mentioned mixture of this invention, and then, is cooled by slow cooling. After this, the resulting alloy is mechanically crushed so as to make a powder having a diameter of 37 μm or below. FIG. 4 shows a cross-sectional drawing of the resulting powder. The meaning of the numeral in FIG. 4 is the same in FIG. 2. In this case, this alloy powder 4 is liable to separation due to the difference in the specific gravity of each element, and has many portions where crystallinity is poor. Comparing FIG. 4 with FIG. 2, the alloy in FIG. 2 differs largely from FIG. 4 in that the alloy in FIG. 2 has a higher crystallinity and numerous irregularities on the surface layer. The crystallinity of the alloy corresponds to the flatness of equilibrium pressure of hydrogen; namely SF-value, which can be obtained when releasing hydrogen as shown in FIG. 1. Therefore, the crystallinity is generally expressed by SF-value. The smaller the SF-value, the higher the crystallinity even if the material is the same. The SF-value of the alloy in FIG. 4 is 2.7 to 3.4 whereas the SF-value of the alloy in FIG. 2 is 1.5 to 2.5.

A sponge-like nickel porous body in which porosity is approximately 93%, thickness is approximately 0.8 mm, and mean spherical space diameter is 400 μm is filled with a paste-like mixture of the powder 4 of hydrogen-storage-alloy of this embodiment and a 5 wt % aqueous solution of a polyvinyl alcohol, and is dried. The obtained body pressed, and then is cut, so that the resulting electrode is 0.5 mm thick, 39 mm wide, and 80 mm long, and has a capacitance capable of charge and discharge of 1600 mAh. FIG. 3 shows a rough cross-sectional view of this electrode 10. In FIG. 3, numeral 4 denotes alloy powder, numeral 5 denotes a framework of the sponge-like nickel porous body, and numeral 6 denotes a space portion.

Figure 5:
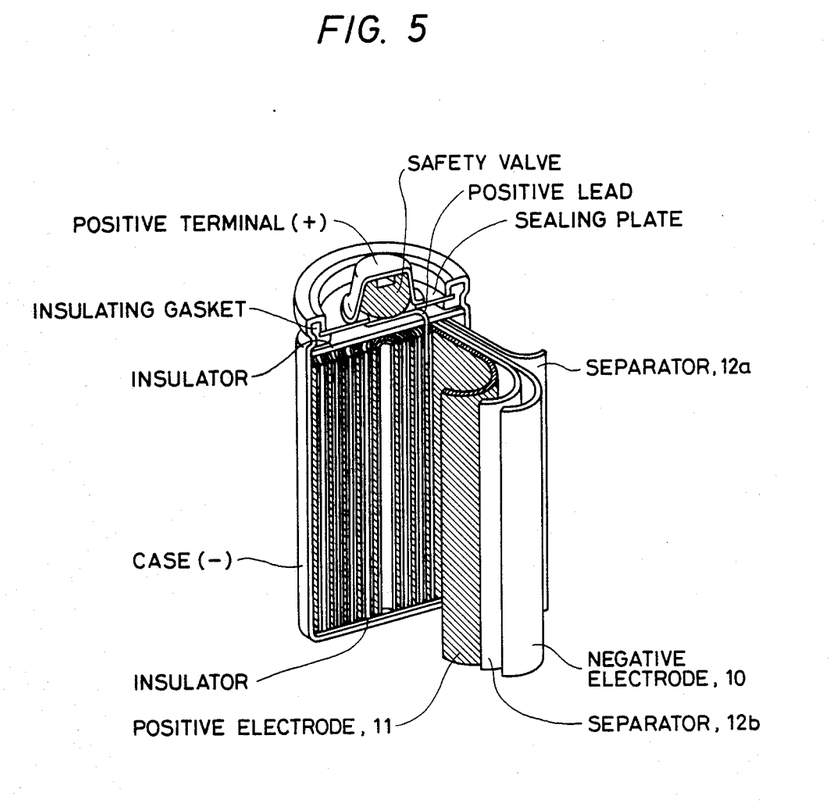
FIG. 5 is a schematic drawing showing the structure of the storage battery of this invention.

The battery system in the present invention is shown in FIG. 5. The battery comprises a casing, a negative electrode 10, a positive electrode 11, two separators 12a and 12b, an electrolyte, a sealing plate, a positive lead, a safety valve, a positive terminal, an insulator, and an insulating gasket. The negative electrode 10, two separators 12a and 12b, and the positive electrode 11 have novel features in their structure. Negative electrode 10, two separators 12a and 12b, and the positive electrode 11 are of thin sheets respectively, and the four sheets are wound in the form of a roll such that the negative electrode 10 and the positive electrode 11 are respectively sandwiched between the separator 12a and the separator 12b. The electrolyte is mainly immersed into the separator 12a and separator 12b. Even if the electrolyte is not described in the battery system, the electrolyte of a conventional KOH aqueous solution is used in the battery system hereinafter. A cylindrical sealed storage battery of AA size is constructed by the resulting electrode 10, a conventional nickel positive electrode 11 of foaming metal type, an electrolyte, and separators 12a and 12b of a nonwoven fabric of a polypropylene introducing sulfonic acid group and has the capacitance of approximately 1000 mAh. The cycle test of charge and discharge at 20° C. has been carried out. Charge is carried out at 100 mA for 15 hours, discharge is carried out at 200 mA to 1.0 V/cell, and life-time is determined by the point where the capacitance decreases to 80% of the initial capacitance.

Figure 6:
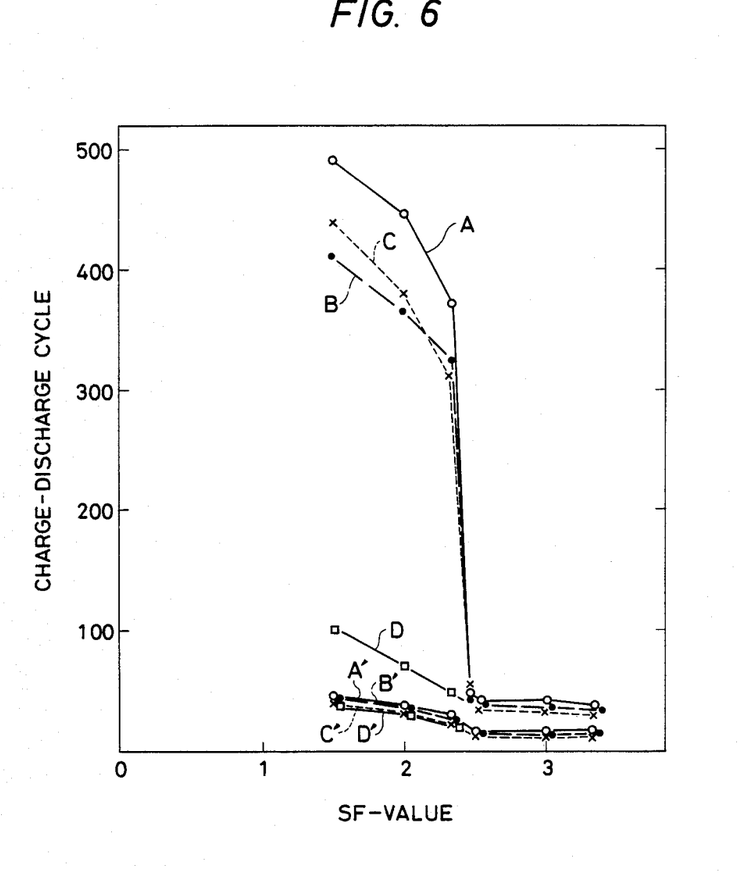
FIG. 6 is a graph showing a relation between SF-value of alloys and charge-discharge cycle of batteries in which there are two types of alloys, namely, one type is treated with both acid and alkali according to the present invention and another type is not treated conventionally.

Hydrogen-storage-alloys of this embodiment are made ten times on an experimental basis, and alloys having following SF-value are selected, i.e. 1.5, 2.0, 2.3 and 2.48. On the other hand, alloys are also made, but these alloys are different from the above-mentioned alloys only in that these alloys are conventionally cooled, namely, by slow cooling. In the case of the latter method, the alloys take SF-value 2.3 to 3.4, and alloys having following SF-value are selected, i.e. 2.52, 3.0 and 3.38. FIG. 6 shows the result of the cycle test. In FIG. 6, the samples (A') to (D') are obtained without acid and alkali treatment, and each point in FIG. 6 is the average of measurements of five storage batteries. SF-value is plotted as abscissa against charge-discharge cycle as ordinate in this figure. The contents of the comparison samples, i.e. (B) to (D) and (B') to (D'), as well as (A) and (A') will be described hereinbelow.

| Battery | (A) (A') | (B) (B') | (C) (C') | (D) (D') |
|---|---|---|---|---|
| Material of Alloy | Mm $Ni_{3.5}Co_{0.8}Al_{0.3}Mn_{0.4}$ | Mm $Ni_{3.5}Co_{0.8}Al_{0.3}Mx_{0.4}$ or Mm $Ni_{3.5}Co_{0.8}Mn_{0.4}Mx_{0.3}$ in which Mx: Cu, Cr, or Fe | $Mm_{0.9}My_{0.1}Co_{0.8}Al_{0.3}Mn_{0.4}$ in which My: Ca, Ti or Zr | Mm $Ni_{4.3}Al_{0.3}Mn_{0.4}$ |
| | (A'): no acid and alkali treatment | (B'): no acid and alkali treatment | (C'): no acid and alkali treatment | (D'): no acid and alkali treatment |

As is apparent from this result, when the alloy powder 4 is treated with both acid and alkali, there is a tendency for the cycling life-time property to be improved. Especially, when alloys, whose SF-value are 2.5 or below, are treated with both acid and alkali, the cycling life-time property is substantially improved. However, in the case of alloys, i.e. (D) or (D'), containing no cobalt, the degree of the improvement in the above-mentioned property is small. From these results, it seems that the acid and alkali treatments mainly elute cobalt so that irregularity on the surface of the alloy powder 4 is formed. Moreover, although the combination of both acid and alkali treatments shows an effect, the same result can be obtained even when acid treatment or alkali treatment is carried out independently for a long period.

Therefore, in the electrode 10 where the negative electrode material is the hydrogen-storage-alloy mainly composed of misch metal and nickel and utilizing at least cobalt as an element to be displaced, a sealed storage battery having a long life-time can be obtained although oxidation is drastic in this battery, by the method that SF-value of the alloy material is 2.5 or below, cobalt is eluted, and lanthanum series metals and nickel are contained at a relatively high ratio.

In this embodiment, alloy materials have been described whose basic form is $MmNi_5$ of $Ca_5Cu_5$ type. However, alloy materials indicated by $MmNi_{4.7-5.3}$ the familiar type also have the crystal structure of $CaCu_5$ type, and show a similar tendency concerning the life-time property.

The powder is treated in the process by both acid and alkali treatments in this embodiment. However, in the state of pole plate where the sponge-like nickel porous body is filled with the paste-like mixture and then is dried, even if both acid and alkali treatments are carried out as well, the improvement of the cycling life-time has been recognized, and the same result has been obtained. The battery system is constructed by utilizing a silver oxide as the positive electrode 11 instead of the nickel oxide, and then the cycling life-time is examined. The cycling life-time is improved and the silver oxide as well as the nickel oxide is effectual, owing to the fact that SF-value of the alloy material of the negative electrode 10 is 2.5 or below, and irregularity on the surface is formed by both acid and alkali treatments. Therefore, as the positive electrode 11, metal oxides can be used which are utilized as the active material for the positive electrode 11 of the alkaline storage battery.

Moreover, with the battery system being constructed by using the material of (A) and the three types of separators 12a and 12b the amount of self-discharge is examined after the battery is fully charged and then left at 45° C. for a month. First separators 12a and 12b are made of a nonwoven fabric of a polyamide, second separator 12 is made of a nonwoven fabric of a polypropylene where surfactants are added so as to improve hydrophilic property, and third separators 12a and 12b are made of a nonwoven fabric of a polypropylene introducing a sulfonic acid group. In the third separators 12a and 12b, 55 to 60% of discharge capacitance is maintained in comparison with the discharge capacitance before the preservation whereas discharge capacitance is not practically detected in the first separators 12a and 12b and the second separators 12a and 12b. It is effectual to use the separators 12a and 12b which are made of the nonwoven fabric of the polypropylene containing a sulfonic acid group in order to decrease the self-discharge.

Another embodiment of the present invention will be described hereinbelow. An alloy is melted by using a high-frequency furnace in the atmosphere of inert gas. The alloy has the composition of $MmNi_{3.5}Co_{0.8}Al_{0.3}Mn_{0.4}$ which composition is the same as that of the hydrogen-storage-alloy shown in the first embodiment. The alloy obtained by the method of rapid cooling is heated in the atmosphere of argon gas, and then, without acid and alkali treatments, is crushed to make fine powder whose diameter is 37 μm or below.

The resulting powder is mixed with a 5 wt% aqueous solution of a polyvinyl alcohol so as to make a paste-like mixture. Then, a sponge-like nickel porous body is filled with the paste-like mixture, and is dried in the same manner as the first embodiment. After this, the electrode is immersed in a KOH aqueous solution (specific gravity is 1.30) for 12 hours. At this time, temperature is varied as follows: 30°, 45°, 50°, 60°, 80°, and 100° C. Then, hydrogen-storage-electrodes as negative electrodes 10 are obtained, by washing, drying, and pressing. The surface is magnified and observed by a microscope with the alloy powder 4 of the resulting hydrogen-storage-alloy being separated. As a result, irregularities in the vicinity of the surface are recognized as shown in FIG. 2, although there is a difference caused by the difference of the immersion temperature.

By cutting the resulting electrodes, the hydrogen-storage-electrodes having a length of 80 mm and a width of 39 mm are obtained. These electrodes 10 have a capacitance capable of charge and discharge of 1600 mAh or above. A cylindrical sealed battery of AA size is constructed by the combination of this electrode 10 and a conventional nickel positive electrode 11 of foaming metal type, and this battery has a capacitance of approximately 1000 mAh. The cycle test of charge and discharge at 20° C. has been carried out. The charge is carried out at 100 mA fo 15 hours, and the discharge is carried out at 200 mA to 1.0 V/cell. The battery construction conditions are shown below, and the result of the cycle test of charge and discharge is shown in FIG. 7.

| Battery | (E-1) | (E-2) | (E-3) | (E-4) | (E-5) | (E-6) | (E-7) |
|---|---|---|---|---|---|---|---|
| Immersion Temp.(°C.) | no treatment | 30 | 45 | 50 | 60 | 80 | 100 |

Figure 7:
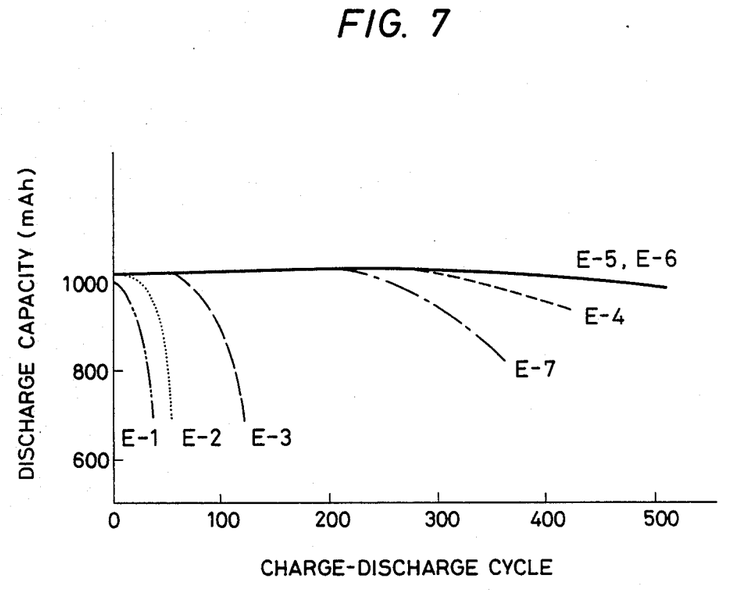
FIG. 7 is a graph showing a relation between the charge-discharge cycle and temperatures at which electrodes are treated with alkali.

As is apparent from FIG. 7, in the case of the battery (E-1) constructed by the hydrogen-storage-electrode without immersing in the alkaline solution, the decrease of the capacitance is recognized when the number of cycles reach approximately 30. On the other hand, the cycling life-time increases with the increment of the immersion temperature, when the electrode is immersed. However, when immersed in the alkaline solution of 100° C., the battery shows unusual behavior. This is because the weight of the battery decreases. In order to quarantee the safety of the battery, the battery is provided with the safety valve which actuates when the pressure in the battery becomes 10 kg/cm$^2$ or above. Therefore, when inner pressure increases, the safety valve actuates to discharge the electrolyte from the battery, so that the weight of the battery decreases. This is because inner pressure of the battery rises on charging. Therefore, it is considered that when the electrode is treated at high temperatures, i.e. 100° C. or above, the absorbing power of oxygen gas decreases and the amount of hydrogen to be occluded electrochemically decreased, so that the pressure in the battery rises.

Figure 8:
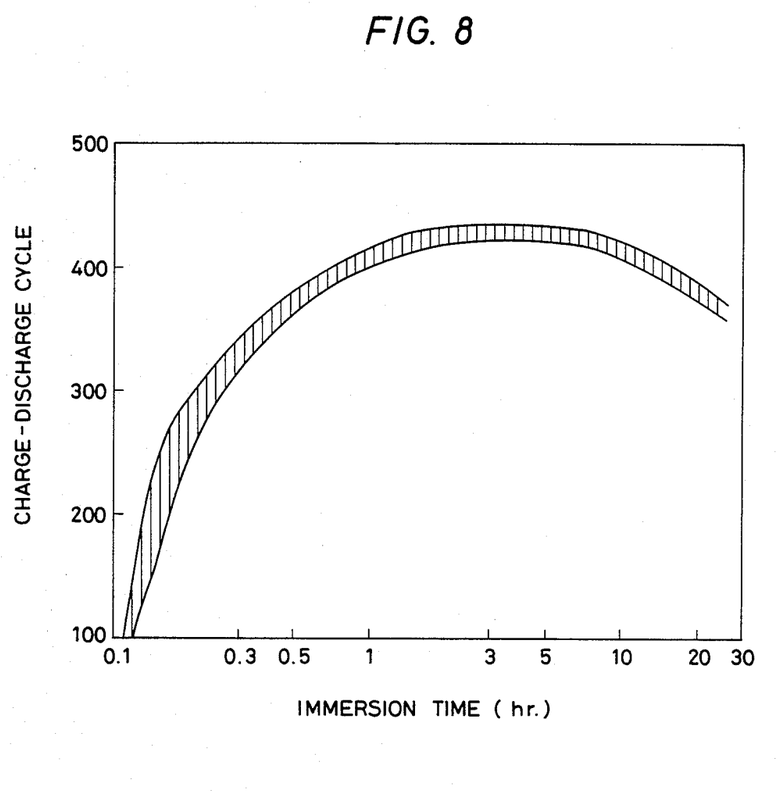
FIG. 8 is a graph showing a relation between the charge-discharge cycle and immersion time at which electrodes are treated with alkali.

On the other hand, the relationship between the cycling life-time and the immersion time in a KOH aqueous solution (specific gravity is 1.3) is shown in FIG. 8. In this figure, the cycling life-time is represented by the number of cycles of charge-discharge where the capacitance decreases to 80% of the initial capacitance. As is apparent from FIG. 8, the electrode can be immersed in the alkaline solution for 0.2 to 24 hours, when the battery is obtained which has the property of the cycling life-time more than 200 cycles. Moreover, the electrode 10 can be immersed in the alkaline solution for 1.0 to 12 hours, when the battery is obtained which has the property of the cycling life-time more than 400 cycles.

As described above, even if the sponge-like nickel porous body is filled with the paste-like mixture of the alloy powder 4 and the 5 wt% aqueous solution of the polyvinyl alcohol, is dried, and then is immersed in the alkaline solution, numerous irregularities in the vicinity of the surface of the alloy is formed so that this method also has an effect on the property of the long life-time of the battery. It has a good effect on the electrode 10 in that the alkaline solution is held at 50° to 100° C. and is maintained for 0.2 to 24 hours. More preferably, it has an improved effect when the alkaline solution is held at 50° to 80° C. and is maintained for 1 to 12 hours. Although in this embodiment, the alkaline solution with a specific gravity of 1.3 is applied, experiments are additionally made in the same manner using the alkaline solutions with a specific gravity of 1.05 to 1.45. From the result of the experiments, since an alkaline solution with a small specific gravity has a few effects, it is necessary for the electrode to be immersed in the alkaline solution for a long time in this case. Therefore, the alkaline solution with a specific gravity of 1.1 or above has a sufficient effect on the electrode 10.

The other embodiment of the present invention will be described hereinbelow. This embodiment relates to the battery system which is capable of a decrease in the self-discharge. The alloy to be utilized as the negative electrode 10 is produced in the same manner as first embodiment. The composition of the alloy is represented by following formula.

$$MmNi_{3.95-x}Mn_xAl_{0.3}Co_{0.75}.$$

In this case, the amount of Ni and Mn is varied, namely, the value of X is changed as follows: 0, 0.2, 0.3, 0.4, 0.6, and 0.8. As a result, six kinds of alloys whose compositions are different are obtained. These six kinds of alloys are milled with a ball mill so as to make powder having a diameter of 37 μm or below. After this, in the same manner as the second embodiment, the sponge-like nickel body is filled with the paste-like mixture of the alloy powder 4 and the 5 wt% aqueous solution of the polyvinyl alcohol, is dried, and then, the resulting material is immersed in the KOH aqueous solution with a specific gravity of 1.3 at 80° C. for 12 hours, is washed with water, is dried, and then, is pressed so that the negative electrode 10 is obtained.

In this case, three kinds of separators 12a and 12b are utilized; that is, first separators 12a and 12b are made of the nonwoven fabric of polyamide, second separators 12a and 12b are made of the nonwoven fabric of the polypropylene where surfactants are added so as to improve hydrophilic property, and third separators 12a and 12b are the nonwoven fabric of the polypropylene containing a sulfanic acid group.

Although various methods for introducing sulfonic acid groups are possible, the following method is adopted. The nonwoven fabric of the polypropylene is immersed in a 20% solution of fuming sulfuric acid for a given period of time so as to introduce a sulfonic acid group to the polypropylene. After this, the fabric is immersed in various concentrations of sulfuric acid in order; that is, first step 90%, second step 60%, and third step 30%. Lastly, the residual sulfuric acid is removed by washing with water, and then, the fabric is dried. The resulting fabric is used as the sulfonated separator. In this case, the amount of sulfonic acid group to be introduced can be varied by the method of varying the time for immersing in the fuming sulfuric acid. In this embodiment, the degree of sulfonation is measured with the immersion time being varied from 10 to 90 minutes. From this result, N-value is distributed from 20 to 250. N-value means the number of monomers in the polypropylene to which one sulfonic acid group is introduced. The sealed nickel-hydrogen storage batteries of AA size, i.e. (F-1) to (F-13), having a discharge capacitance of approximately 1000 mAh are assembled by combining these separators 12a and 12b, the six kinds of the hydrogen-storage-electrodes described above, and the conventional nickel positive electrode 11 of the foaming metal type as shown in Table 1.

TABLE 1

| Battery | Composition at Alloy | Separator (N—value) |
|---|---|---|
| F-1 | Mm $Ni_{3.55}Mn_{0.4}Al_{0.3}Co_{0.75}$ | 20 |
| F-2 | Mm $Ni_{3.55}Mn_{0.4}Al_{0.3}Co_{0.75}$ | 25 |
| F-3 | Mm $Ni_{3.55}Mn_{0.4}Al_{0.3}Co_{0.75}$ | 53 |
| F-4 | Mm $Ni_{3.55}Mn_{0.4}Al_{0.3}Co_{0.75}$ | 92 |
| F-5 | Mm $Ni_{3.55}Mn_{0.4}Al_{0.3}Co_{0.75}$ | 148 |
| F-6 | Mm $Ni_{3.55}Mn_{0.4}Al_{0.3}Co_{0.75}$ | 250 |
| F-7 | Mm $Ni_{3.95}Al_{0.3}Co_{0.75}$ | 92 |
| F-8 | Mm $Ni_{3.75}Mn_{0.2}Al_{0.3}Co_{0.75}$ | 92 |
| F-9 | Mm $Ni_{3.65}Mn_{0.3}Al_{0.3}Co_{0.75}$ | 92 |
| F-10 | Mm $Ni_{3.35}Mn_{0.6}Al_{0.3}Co_{0.75}$ | 92 |
| F-11 | Mm $Ni_{3.15}Mn_{0.8}Al_{0.3}Co_{0.75}$ | 92 |
| F-12 | Mm $Ni_{3.55}Mn_{0.4}Al_{0.3}Co_{0.75}$ | Polyamide (Conventional ex.) |
| F-13 | Mm $Ni_{3.55}Mn_{0.4}Al_{0.3}Co_{0.75}$ | Polypropylene (Conventional ex.) |

N—value means the number of monomers in the polypropylene to which one sulfonic acid group is introduced.

Figure 9:
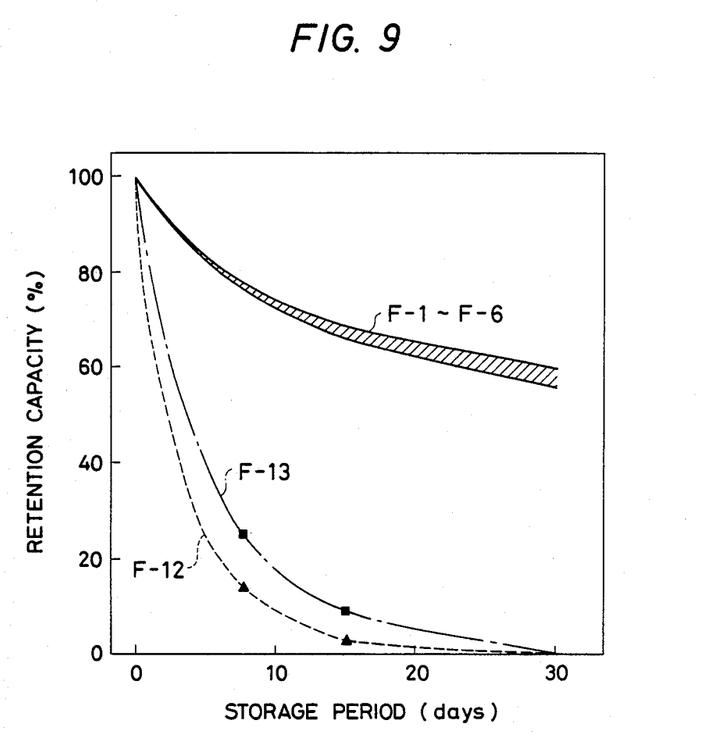
FIG. 9 is a graph showing a relation between types of separators and degrees of self-discharge.

The self-discharge is measured as described below. The charge is carried out at charging rate of 0.1 CmA to 150% relative to a nominal capacitance of 1000 mAh, and the discharge is continued at 0.2 CmA until the voltage becomes 1.0 V at 20° C. Both the charge and discharge are repeated twenty times under the same conditions described above, and then, the charge is carried out in the same manner as described above. Next, the batteries are maintained at 45° C. for a given period of time after charging. Then, the discharge capacitance is measured in such a way that the discharge is carried out at the discharging rate of 0.2 CmA until the voltage becomes 1 V at 20° C. From these results, retention capacity is calculated by comparing the resulting discharge capacitance with the discharge capacitance before preservation. In FIG. 9, storage period is plotted as abscissa against the retention capacity as ordinate concerning (F-1) to (F-6), (F-12), and (F-13). As is apparent from FIG. 9, when battery (F-12) applying the fabric of the polyamide to the separators 12a and 12b and battery (F-13) applying the fabric of the polypropylene where surfactants are added are preserved at 45° C. for 30 days, the retention capacity becomes 0%, namely, the degree of the self-discharge is 100%.

On the contrary, batteries (F-1) to (F-6) using separators 12a and 12b where N-values are 20 to 250, show an excellent effect. Namely, even if batteries are maintained at 45° C. for 30 days, the retention capacity is 55 to 60%. However, when the battery is constructed by utilizing the separators 12a and 12b made of the fabric of the polypropylene (N-value=20), a short phenomenon arises between the positive electrode 11 and the negative electrode 10 in proportion of one to four. This is because the increment of the sulfonic acid group causes the strength of the separators 12a and 12b to decrease. Moreover, when the separators 12a and 12b made of the fabric of the polypropylene (N-value=250 or above) are applied to the battery, the time for injecting the electrolyte on constructing the battery is increased and the cycling life-time of the battery is decreased. This is because the amount of sulfonic acid groups become substantially smaller. As a result, it became clear that the optimal N-value is 20 to 250.

Figure 10:
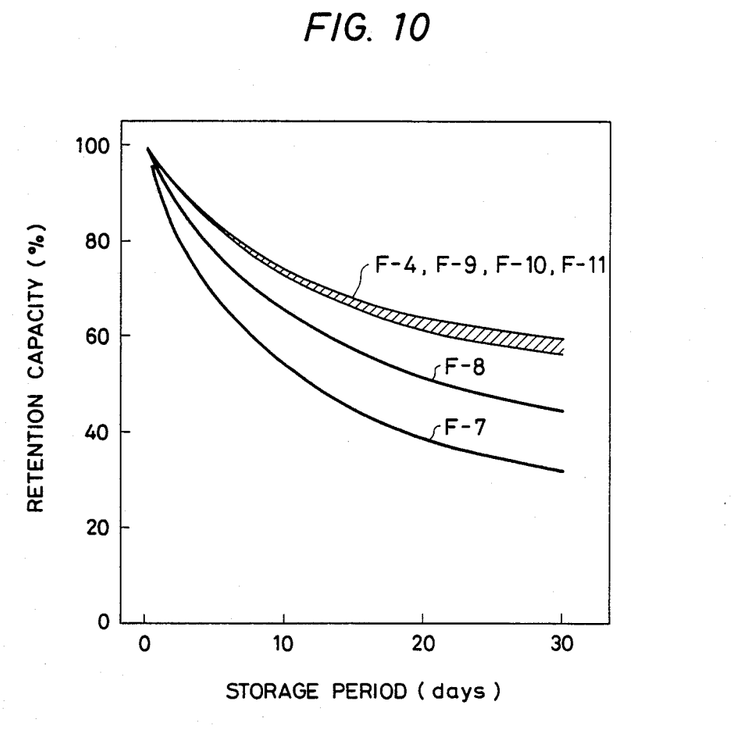
FIG. 10 is a graph showing a relation between contents of Manganese in alloys and degrees of self-discharge during preservation.

FIG. 10 shows that the property of the self-discharge is varied, when the component of the alloys is varied with the degree of sulfonation being fixed. As is apparent from FIG. 10, although the retention capacity of the battery (F-7) utilizing alloy without containing Mn is superior to that of the batteries (F-12) and (F-13) shown in FIG. 9, the retention capacity is 40% or below when maintaining for 30 days. However, when x is 0.2 or above in the formula of the alloy, the retention capacity is 40% or above after being maintained for 30 days. However, when x is 0.8 or above in the formula of the alloy, equilibrium disassociation pressure of the hydrogen-storage-alloy decreases and the discharge capacitance becomes small. As a result, it is difficult to design a battery having a high capacitance.

In this embodiment, the nonwoven fabric of the polypropylene having the porosity of 65% is used. However, when the battery is constructed by utilizing the nonwoven fabric of the sulfonated polypropylene having the porosity of 70% or above, the strength of the separators 12a and 12b decreases and short phenomenon arises. On the other hand, when the sulfonated polypropylene having the porosity of 40% or below as the separators 12a and 12b used, the penetrating velocity of oxygen generated at the positive electrode 11 on overcharging through the separators 12a and 12b decreases, and the electrolyte into the separators 12a and 12b increases. Therefore, the absorptivity of oxygen gas on the surface of the negative electrode 10 decreases so that the increment of the pressure in the battery or the leakage of the electrolyte arises. As a result, the porosity of 40 to 70% is suitable for the sulfonated separator.

Moreover, polypropylene resin is used as one example of a polyolefin resin in this embodiment. However, the same result can be obtained even if polyethylene resin is used. Sulfonation is carried out by fuming sulfuric acid in this embodiment. However, the same result can be obtained by limiting the degree of sulfonation as described above, even if the other sulfonating agents such as heated concentrated sulfuric acid or sulfur trioxide are used. As a result, this technique can be widely used by limiting the degree of sulfonation.

The above-described embodiments are just examples of the present invention, and therefore, it will be apparent for those skilled in the art that many modifications and variations may be made without departing from the spirit of the present invention.

What is claimed is:
1. A sealed storage battery comprising:
   (a) a positive electrode including a metallic oxide;
   (b) a negative electrode including hydrogen-storage-alloy powder having a crystal structure of $CaCu_5$, being provided with numerous irregularities on a surface, and having an SF-value of 2.5 or below, said SF-value representing a plateau characteristic of equilibrium pressure of released hydrogen;
   (c) an alkaline electrolyte; and
   (d) separator means for separating said positive electrode from said negative electrode, and for absorbing and retaining said alkaline electrolyte.

2. A sealed storage battery as claimed in claim 1, wherein a composition of said hydrogen-storage-alloy powder is represented by the formula, M $Ni_x$ M'(5-x), wherein M is a single element or combined elements selected from the group consisting of Mm, Ca, Zr and Ti, said M' being a single element or combined elements selected from the group consisting of Co, Al, Mn, Cu, Cr and Fe, and the value of x being 3 or above.

3. A sealed storage battery as claimed in claim 1, wherein said positive electrode is nickel oxide.

4. A sealed storage battery as claimed in claim 1, wherein said separator means is made of a polyolefin resin containing a sulfonic acid group or its alkali metal salts.

5. A sealed storage battery as claimed in claim 1, wherein irregularities on a surface of said hydrogen-storage-alloy powder are made by mechanical grinding or eluting a part of alloy components into acid solution or alkaline solution.

6. A sealed storage battery comprising:
   (a) a positive electrode including a sintered nickel electrode or a non-sintered nickel electrode comprising a metallic porous body filled with nickel compounds or a nickel oxide;
   (b) a negative electrode including a hydrogen-storage-electrode comprising an alloy having a crystal structure $CaCu_5$ and represented by the formula, $Mm_{1-x}M_{1x}Ni_yM_{2z}$, having an SF value of 2.5 or below, and having numerous irregularities on a surface layer of a powder of said alloy, said SF-value representing a plateau characteristic of equilibrium pressure of released hydrogen;
   (c) an alkaline electrolyte; and
   (d) separator means for separating said positive electrode from said negative electrode, and for absorbing and retaining said alkaline electrolyte, wherein in said formula, Mm is misch metal, $M_1$ is a single element or combined elements selected from the group consisting of Ca, Ti and Zr with which said misch metal is replaced, $M_2$ being a single element or combined elements selected from the group consisting of Co, Al, Mn, Cu, Cr, and Fe with which a part of nickel is replaced, x, y, and z being restricted by $1 > x \geq 0$, $y > 3.0$, $z > 0$ and $4.7 \leq y + z \leq 5.3$, said SF-value representing a plateau characteristic of equilibrium pressure of released hydrogen calculated by an equality SF-value $= \ln (P_{G/M} = 0.75 / P_{H/M} = 0.25)$.

7. A sealed storage battery as claimed in claim 6, wherein the hydrogen-storage alloy powder is represented by the formula $MmNi_{3.95-x}Mn_xAl_{0.3}Co_{0.75}$, in which $0.8 \geq x \geq 0.2$.

8. A sealed storage battery as claimed in claim 6, wherein said separator means is a porous body of a polyolefin resin containing a sulfonic acid group or its alkali metal salts.

9. A sealed storage battery as claimed in claim 6, wherein said separator means is made of a polyolefin resin containing a sulfonic acid group or its salts, and the number of monomers of polyolefin to each sulfonic acid group or its salts is limited from 20 to 250.

10. A sealed storage battery as claimed in claim 6, wherein said separators means is made of a e polyolefin resin containing a sulfonic acid group or its salts and has a porosity of 40 to 70%.

11. A sealed storage battery comprising:
    (a) a positive electrode including a metallic oxide;
    (b) a negative electrode including a hydrogen-storage-alloy powder having a $CaCu_5$ crystal structure, and provided with numerous irregularities on a surface thereof, said hydrogen-storage-alloy powder being represented by a formula $Mn_{1-x}M_{1x}Ni_y M_{2z}$ wherein $m_1$ is one of Ca, Ti, and Zr; $M_2$ is one of Co, Al, Mn, Cu, Cr, and Fe; $1 < X \leq 0$, $y < 3.0$, $z < 0$ and $4.7 \leq y + z \leq 5.3$, said numerous irregularities being made by mechanical grinding or eluting a portion of alloy components into acid solution and/or alkaline solution;
    (c) an alkaline electrolyte; and
    (d) separator means for separating said positive electrode from said negative electrode, and for absorbing and retaining said alkaline electrolyte.

* * * * *